(12) United States Patent
Che et al.

(10) Patent No.: US 10,895,727 B1
(45) Date of Patent: Jan. 19, 2021

(54) MICROSCOPE FOR LOCATING STRUCTURES ON THE INNER SURFACE OF A FLUIDIC CHANNEL

(71) Applicant: SequLITE Genomics US, Inc., Dublin, CA (US)

(72) Inventors: James Che, San Ramon, CA (US); Diping Che, San Ramon, CA (US)

(73) Assignee: Sequlite Genomics US, Inc.

(*) Notice: Subject to any disclaimer, the term of this patent is extended or adjusted under 35 U.S.C. 154(b) by 0 days.

(21) Appl. No.: 16/658,052

(22) Filed: Oct. 19, 2019

(51) Int. Cl.
*G01N 21/64* (2006.01)
*G02B 21/24* (2006.01)
*G02B 21/02* (2006.01)
*G02B 21/16* (2006.01)

(52) U.S. Cl.
CPC ....... *G02B 21/245* (2013.01); *G01N 21/6428* (2013.01); *G01N 21/6458* (2013.01); *G02B 21/02* (2013.01); *G02B 21/16* (2013.01); *G01N 2021/6441* (2013.01); *G01N 2021/6463* (2013.01); *G01N 2021/6482* (2013.01)

(58) Field of Classification Search
CPC ...... G02B 21/245; G02B 21/16; G02B 21/02; G01N 21/6428; G01N 21/6458; G01N 2021/6482; G01N 2021/6463; G01N 2021/6441
See application file for complete search history.

(56) References Cited

U.S. PATENT DOCUMENTS

| 4,844,617 A | 7/1989 | Kelderman et al. |
|---|---|---|
| 5,054,926 A | 10/1991 | Dabbs et al. |
| 5,604,344 A | 2/1997 | Finarov |
| 5,785,651 A | 7/1998 | Kuhn et al. |
| 6,025,905 A * | 2/2000 | Sussman ............ G01N 21/8806 356/3.01 |
| 6,075,558 A | 6/2000 | Tachibana et al. |
| 6,677,565 B1 | 1/2004 | Wahl et al. |
| 6,825,454 B2 | 11/2004 | Czarnetzki et al. |
| 6,981,642 B2 | 1/2006 | Krichever |
| 7,006,235 B2 | 2/2006 | Levy et al. |
| 7,295,303 B1 * | 11/2007 | Vaez-Iravani .... G01N 21/95623 356/237.1 |
| 7,626,151 B2 | 12/2009 | Sander |
| 7,663,078 B2 | 2/2010 | Virág et al. |
| 7,751,046 B2 | 7/2010 | Levy et al. |
| 8,643,946 B2 | 2/2014 | Westphal et al. |
| 9,229,209 B2 | 1/2016 | Arnz et al. |
| 9,255,348 B2 | 2/2016 | Zenhausern et al. |

(Continued)

OTHER PUBLICATIONS

Botcherby et al., "Scanning two photon fluorescence microscopy with extended depth of field," 2006, Optics Communications, vol. 268, pp. 253-260. (Year: 2006).*

*Primary Examiner* — Kiho Kim (57) ABSTRACT

A microscope has a fiducial mask and fiducial lens generating a collimated mask image onto a beam splitter which directs the optical image to an objective lens where it is directed to an optical discontinuity formed by the change of index of refraction of the inner surface of a fluidic channel. Reflected optical energy is directed through the objective lens, the beam splitter, and a detector lens to a detector. A focused image forms when an inner surface of the fluidic channel is a focal distance from the objective lens, providing for imaging of fluorescent labels at the inner surface of the fluidic channel.

23 Claims, 3 Drawing Sheets

(56) References Cited

U.S. PATENT DOCUMENTS

| | | | |
|---|---|---|---|
| 9,297,994 B2 | 3/2016 | Perlitz et al. | |
| 9,389,405 B2 | 7/2016 | Westphal et al. | |
| 9,568,724 B2 | 2/2017 | Westphal et al. | |
| 10,146,041 B1 | 12/2018 | Putman et al. | |
| 10,247,910 B1 | 4/2019 | Putman et al. | |
| 10,455,137 B2 | 10/2019 | Saphier et al. | |
| 2013/0161484 A1* | 6/2013 | Hu | G02B 7/34 |
| | | | 250/201.4 |
| 2015/0211997 A1* | 7/2015 | Dake | G02F 1/21 |
| | | | 250/550 |
| 2016/0017340 A1* | 1/2016 | Wu | C12N 13/00 |
| | | | 435/455 |
| 2016/0320600 A1* | 11/2016 | Dake | G02B 21/0056 |
| 2017/0370698 A1* | 12/2017 | Wu | G03F 1/84 |

* cited by examiner

MICROSCOPE FOR LOCATING STRUCTURES ON THE INNER SURFACE OF A FLUIDIC CHANNEL

FIELD OF THE INVENTION

The present invention relates to a microscope. In particular, the invention relates to a microscope for focusing on and locating structures at a partially reflective interface where multiple partially reflective interfaces are present.

BACKGROUND OF THE INVENTION

In certain industries, such as genetic sequencing and genetic research, it is desired to detect the nucleotides which are characteristic chemical moieties of nucleotides which constitute nucleic acids. Five nucleobases-adenine (A), cytosine (C), guanine (G), thymine (T), and uracil (U)—are called primary or canonical. They function as the fundamental units of the genetic code, with the bases A, G, C, and T being found in DNA while A, G, C, and U are found in RNA. Rare bases have also been found in nature, such as 5-methylcytosine and other methylated bases, 5-hydroxymethylcytosine, 5-formylcytosine and 5-carbosylcytosine. Other noncanonical bases include isoguanine, isocytosine and universal bases such as inosine.

These nucleotides can be detected using fluorescent labeling specific to each type of nucleobase. The types of fluorescent labeling include direct labeling by covalent labeling of nucleic acids with a fluorescent label or noncovalent binding or intercalation of a fluorescent dye to nucleic acids, and indirect labeling via covalent attachment of a secondary label to a nucleic acid, and then binding this to a fluorescently labeled ligand binder. An alternative indirect strategy involves binding of a nucleic acid to a nucleic acid binder molecule (e.g., antibody, antibiotic, histone, antibody, nuclease) that is labeled with a fluorophore. Fluorescent labels for nucleic acids include organic fluorescent dyes, metal chelates, carbon nanotubes, quantum dots, gold particles, and fluorescent minerals.

The fluorescent labels preferably fluoresce at unique wavelengths when exposed to a broadband optical source, thereby providing a method for identification of each of the subject nucleotides in a two dimensional (2D) spatial image.

The fluorescent labels are bound to the nucleotides, which are located on the surfaces of the flow cell, and unnecessary exposure of the fluorescent labels to the excitation source causes "photobleaching", a temporal phenomenon where excitation of the label results in a decreased fluorescence optical output over time. This is a problem in the prior art where the label activation energy is applied, and the microscope is focused by using the fluorescent labels as the focus target, thereby exposing the labels to photobleaching energy during the microscope focusing interval. Because the fluorescent labels are small and the magnification large, the range of microscope image focus is short, and the fluorescent labels do not appear until in the narrow range of sharp focus. During this time interval of microscope focusing, photobleaching is occurring, which reduces the optical energy available for imaging the fluorescent labels, thereby reducing the signal to noise ratio at the detector. Additionally, the fluorescent label optical intensity is comparatively low, increasing the difficulty of focusing when using the fluorescent labels as focusing targets.

It is desired to provide a microscope which provides for focusing on an inner surface of a flow cell such as one where nucleotides and associated fluorescent labels may collect, followed by application of fluorescence activation energy to image the inner surface of the flow cell and associated fluorescent labels.

OBJECTS OF THE INVENTION

A first object of the invention is a microscope having an illuminated fiducial pattern which is positioned a fiducial lens focal length from a fiducial lens, the optical energy from the fiducial lens directed to a beamsplitter and to an objective lens positioned an adjustable distance from a flow cell having inner surfaces, the objective lens on the optical axis of a detector lens, the detector lens receiving optical energy which passes through the beamsplitter and focuses the optical energy to a detector, the microscope thereby configured to position the fiducial pattern onto a change in refractive index of the flow cell sufficient to form a partially reflective interface and provide for focusing the microscope onto an inner surface of the flow cell.

A second object of the invention is a method for imaging the inner surface of a flow cell at an interface having a change in refractive index, the method comprising forming collimated fiducial pattern optical energy and directing the collimated fiducial pattern optical energy to an objective lens an adjustable distance from the flow cell, where optical energy reflected from the flow cell interface is directed to a detector lens and focused onto a detector, the method comprising first adjusting the adjustable distance until the fiducial pattern presents as a focused image at the detector, and subsequently illuminating the flow cell with optical energy operative to fluoresce labels at an inner surface of the flow cell and forming an image at the detector.

A third object of the invention is a system for detecting a discontinuity in index of refraction forming a partially reflective optical interface, the system comprising a fiducial pattern generator forming a collimated image, the collimated image directed to an objective lens such as through a beamsplitter, the objective lens positioned a variable focal length from the discontinuity in index of refraction forming a partially reflective optical interface, reflected optical energy from the partially reflective interface directed through the objective lens and to a detector lens and a detector positioned a focal length from the detector lens.

A fourth object of the invention is a method for locating a surface of a flow cell, the method comprising:
directing collimated optical energy from a fiducial pattern through an objective lens positioned an adjustable distance from a surface of the flow cell;
directing reflected optical energy from the surface of the flow cell through the objective lens through a detector lens and to a detector positioned a detector lens focal length from the detector lens;
adjusting the distance from the objective lens to the flow cell until a focused image of the fiducial pattern is present in the detector.

A fifth object of the invention is a method for imaging fluorescent labels adjacent to an inner surface of a flow cell, the method comprising:
directing collimated optical energy from a fiducial pattern through an objective lens an adjustable length from the inner surface of the flow cell;
directing reflected optical energy from the inner surface of the flow cell through the objective lens to a detector lens and to a detector positioned a detector lens focal length from the detector lens;

adjusting the distance from the objective lens to the flow cell inner surface until a focused image of the fiducial pattern is present in the detector;

illuminating the flow cell with optical energy, causing the labels to fluoresce and provide a focused image at the detector.

SUMMARY OF THE INVENTION

A microscope provides for imaging fine structures such as fluorescent labeled nucleotides at the inner surface of a fluidic channel. In particular, the microscope provides for the location of an upper or lower inner surface of a fluid channel and subsequent measurement of structures such as fluorescent labeled nucleotides which are adjacent to the upper or lower inner surface of the fluidic channel.

In one example of the invention, a fluidic channel has substantially planar upper or lower interior surfaces in a region of desired observation. The substantially planar interior surface is within an adjustable distance which includes the focal distance of an objective lens when the flow channel is present. A detector lens is positioned on the same axis as the objective lens, and a detector is positioned a detector lens focal length from the detector lens. An illuminated image mask with a fiducial pattern is positioned a fiducial lens focal length from a fiducial lens and substantially perpendicular to the axis of the objective lens. Preferably low intensity illumination energy from the fiducial lens is directed to a beam splitter located between the objective lens and detector lens, which directs the optical energy from the fiducial lens to the objective lens, where it forms an image of the fiducial pattern a focal length from the objective lens, causing focused or unfocused optical energy to be reflected from the discontinuity in index of refraction at the substantially planar inner surface of the fluidic channel. When the objective lens is a focal length from the substantially planar surface of the fluidic channel, focused reflected optical energy from the objective lens travels to the detector lens and forms a focused image of the fiducial pattern on the detector, providing the ability to precisely locate the inner surface and perform measurements with respect to that surface. The objective lens has a focal length which is preferably short to provide a minimum depth of field for measurement of adjacent structures to be measured. The combined flow cell top layer thickness and flow cell channel depth is constrained to be smaller than the focal length of the objective to ensure the ability of the microscope to focus on both the upper and lower inner surface of the flow cell.

After the flow cell surface is located using comparatively low intensity light for fiducial illumination, imaging is performed of the fluorescent features adjacent to the flow cell surface using high intensity optical energy suitable for imaging fluorescent labels associated with the nucleotides. A focused image of the fluorescent labels is thereby provided to the detector, and the low intensity fiducial illumination energy prior to the application of fluorescent label illumination energy greatly reduces undesired photobleaching.

DETAILED DESCRIPTION OF THE INVENTION

Figure 1:
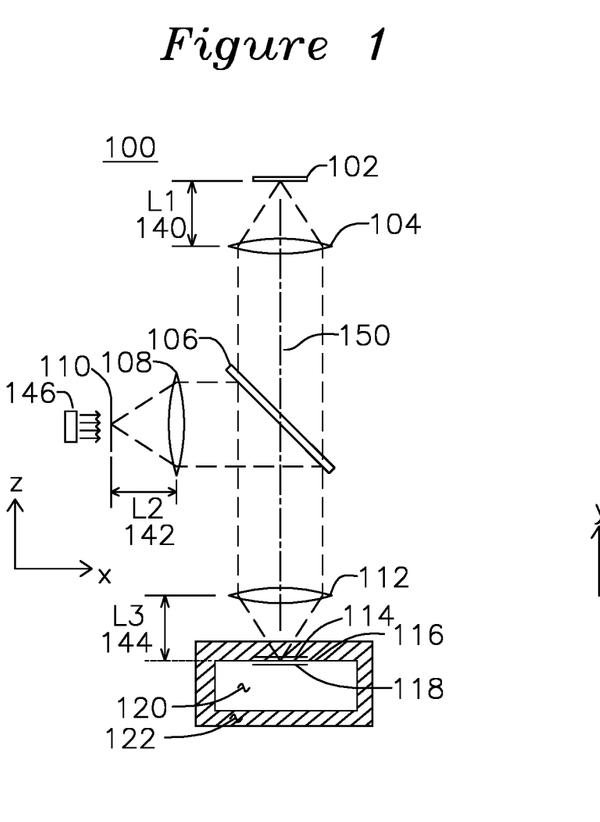
FIG. 1 is a section view of a microscope according to an aspect of the invention.

FIG. 1 shows a microscope according to an aspect of the invention. Reference coordinates x,y,z are shown in each drawing figure for reference to other drawing figures. A fluidic channel 120 is formed in transparent housing 122, and includes a substantially planar inner surface 116. The index of refraction for the housing 122 is selected to be different from the index of refraction of a fluid being transported in the fluidic channel 120 by a ratio sufficient to form a partially reflective interface, such as one returning at least 0.06% of the incident optical energy, corresponding to a difference of index of refraction of at least 5% greater or smaller, or a minimum difference of 1% greater or smaller index of refraction at the partially reflective interface, returning ~25 ppm of the incident optical energy. An example reflective interface is formed by the case of glass (1.5) over water (1.33), and a larger ratio of the two refractive indices is preferable, as the ratio is proportional to the reflected optical energy which is directed to the detector 102 for image formation and the change in index of refraction forms a reflective interface at the glass/liquid interface. Where the inner flow channel interface is encountered in the plurality of partially reflective surfaces, each partially reflective surface is reflecting a percentage of the incoming optical energy according to the well-known Fresnel ratio $$R = \left| \frac{n1 - n2}{n1 + n2} \right|^2$$

where:

n1 and n2 are the index of refraction sequence as encountered by the incoming optical energy;

R is the coefficient of reflection returned by the partially reflective interface. For reflective interfaces such as the flow channel upper surface, the optical energy transmitted through the subsequent optical interface T is 1-R for the subsequent optical interface.

The increased proportion of reflected optical energy improves resolution and reduces the required optical energy to perform the initial focusing of the microscope on the flow cell inner surface. Additionally, the optical energy of the fiducial optical source may be on the order of $1/10$, $1/100$, $1/1000$, $1/10,000$ or $1/100,000$ of the optical energy required to cause the fluorescent labels to become visible, thereby reducing the likelihood of photobleaching while also providing features with greater contrast for focusing the objective. The improved focus accuracy thereby provides for greater accuracy and resolution in establishing the objective lens to reflective surface focusing, greatly reducing the photobleaching of the fluorescent labels, since the reduced optical energy of the fiducial source is well below the photobleaching threshold.

Optical source 146 generates uncollimated optical energy which backlights fiducial image mask 110 projecting the image mask pattern onto fiducial lens 108. Image mask 110 comprises patterns formed in optically opaque and transparent features, the fiducial image mask 110 being a focal length L2 142 from fiducial lens 108A, resulting in collimated optical energy which reflects from beam splitter 106 to objective lens 112 on axis 150, where it is focused at an image plane a focal length below objective 112 and reflected by the index of refraction discontinuity at the inner surface 116 of the fluidic channel 120.

The fiducial image is projected into the inner surface 116, and when the distance from the objective lens 112 to the inner surface 116 is equal to the focal length L3 144 of objective lens 112, a sharp image will be reflected by the inner surface 116. When the separation distance L3 is slightly greater than the focal length of the objective lens 112, the image focal plane at 114 results in the reflection of an out-of-focus image at the inner surface 116 where the discontinuity in refractive index (and reflective surface) is located. Similarly, a shorter distance L3 144 will result in a sharp focal plane at 118, whereas optical energy reflected from the index of refraction discontinuity at surface 116 will similarly be out-of-focus. The particular nature of the out-of-focus fiducial image patterns which are reflected to the detector 102 are governed by the well-known circle of confusion and point spread function, and are dependent on the particular fiducial image pattern in use.

When objective lens 112 is focused on the fiducial image in focus at inner surface 116, reflected optical energy is collimated by objective lens 112, and travels on optical axis 150 through beam splitter 106 to detector lens 104 which is a fixed focus separation L1 140 from detector 102, thereby forming a focused image from inner surface 116 onto detector 102.

In an example embodiment, objective lens 112 focal length is variable, such as by moving a stage holding the fluidic channel assembly 120/122 with respect to the objective lens 112 along the z axis shown in FIG. 1. Fiducial lens 108 is a fixed focal length L2 142 from the fiducial pattern of fiducial mask 110, and the detector 102 is a fixed focal length L1 140 from detector lens 102. According to this example embodiment, the displacement of the inner surface 116 such as by movement of fluidic channel assembly 120/122 in the z axis until a sharp focus of the fiducial pattern occurs at detector 102 provides for a precise determination of the inner surface 116.

Figure 4:
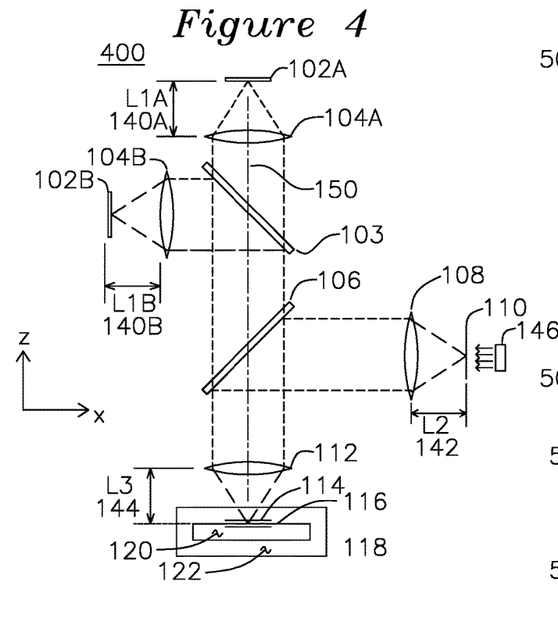
FIG. 4 is a section view of a microscope according to another aspect of the invention.

FIG. 4 shows an example of the invention providing the focusing function described in FIG. 1, with additional capability for multiple wavelength fluorescent label imaging. Reference numbers performing the same function as the structures of other figures use the same reference numbers. The operation of focusing on an inner surface 116 of the flow channel 120 occurs as was previously described by adjusting distance L3 144 until a sharp image of the fiducial pattern 110 is present on a detector 102 (also referred to as a fiducial detector where multiple detectors are present). After the focal adjustment of distance L3 144 is completed, an external fluorescent label optical source (not shown) illuminates the field of the flow channel 120, causing the fluorescent labels associated with nucleotides on an inner surface 116 of the flow channel to emit optical energy, each fluorescent label emitting optical energy in a unique wavelength from other fluorescent labels, resulting in a multi-colored fluorescent label pattern to be directed along optical axis 150 through beamsplitter 106 and to beamsplitter 103. Optical energy is directed to lens 104B to fluorescent label detector 102B and also to lens 104A to fluorescent label detector 102A. Although two detectors are shown, the invention may be operative using any number of lens/beamsplitter/detector optical paths, one for each range of wavelengths emitted by a particular fluorescent label. In an example of the invention, for imaging RNA or DNA with four fluorescent labels, four optical paths and associated fluorescent label detectors may be used, each responsive to an associated fluorescent label. Each detector path (comprising dichroic reflector or beamsplitter, detector lens, and detector) is typically sensitive to a range of wavelengths associated with the emitted wavelength of a particular fluorescent label. In one example of the invention, beamsplitter 103 has a dichroic reflective coating which reflects a specified range of wavelengths to fluorescent label detector 102B, and passes other wavelengths to fluorescent label detector 102A with minimal transmission loss. In another example of the invention, a cascaded series of dichroic reflectors 103 can be provided on the optical axis 150, each dichroic reflector, lens, and detector associated with a particular fluorescent label wavelength. In another example of the invention for simultaneous imaging of the fluorescent labels with a single detector, a single multi-wavelength color detector may be used which has sufficient spatial resolution and wavelength resolution to display the fluorescent labels in a separable form by wavelength. For example, rather than an RGB (red, green, blue) solid state image detector, a four or five channel detector may be used which is specific to the particular wavelengths, or the RGB channels may be linearly combined to isolate the RGB image response into the particular fluorescent wavelengths.

In one aspect of the invention, lenses 104, 108, and 112 are anti-reflective or have achromatic coatings as previously described. In another aspect of the invention, the optical source 146 may be a narrowband visible optical source such as a light emitting diode (LED) to reduce chromatic aberration and chromatic distortion of the lenses 104, 106, and 112. In another aspect of the invention, the image mask 110 is a quartz or glass substrate with patterned chrome forming the fiducial pattern deposited on the substrate surface facing fiducial lens 108 with the patterned chrome positioned at the focal plane of lens 108. It will be appreciated that the optical paths may incorporate additional components such mirrors, lenses, beam splitters and optical sources, so long as he essential features of the optical path of the invention is maintained.

Figure 2:
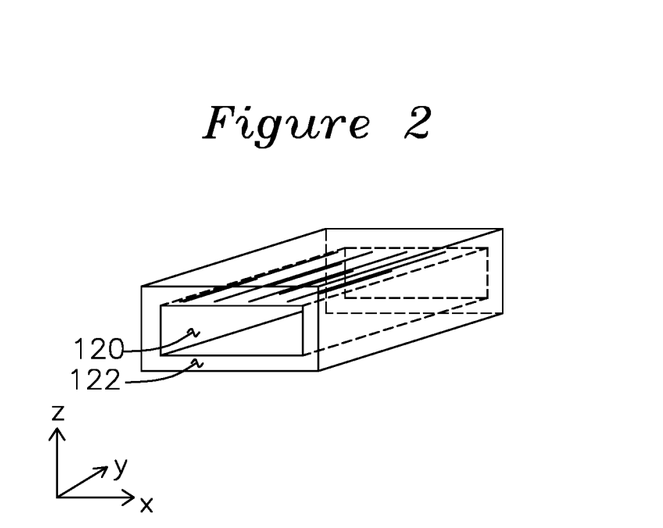
FIG. 2 is a perspective view of a fluidic channel of FIG. 1.

FIG. 2 shows an example fluidic channel formed from a material which is transparent to the wavelength used for fiducial illumination as well as for the fluorescent marker wavelengths.

Figure 3:
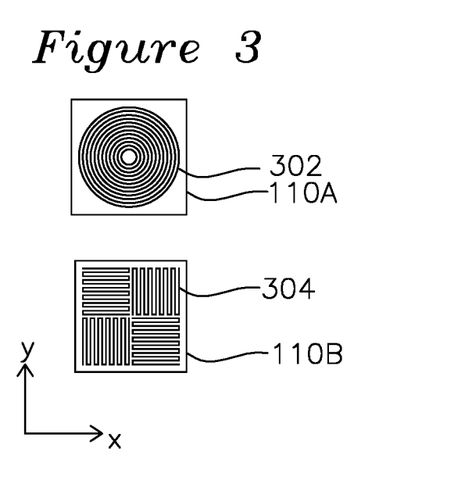
FIG. 3 is a projection view of example fiducial masks for use with the microscope of FIG. 1.

FIG. 3 shows example fiducial patterns 302 and 304 which may be applied to fiducial mask 110A and 110B, respectively. Fiducial pattern 302 formed of concentric circles may be useful where it is desired to correct non-planarity of the inner surface 116 when it is undesirably tilted with respect to the x-y plane, as the out of focus regions will indicate direction and angle of the tilt for correction. Alternatively fiducial pattern 304 formed of an array of lines or other patterns which have features predominantly in the x axis or y axis may be used for automatic focusing using the detector response along a single line of detector photosensors approximately perpendicular to the array of lines. In another aspect of the invention, the fiducial patterns may include patterns with particular separation distances to enable visual measurements of structures bound to the surface 116 in the x and y directions.

Figure 5A:
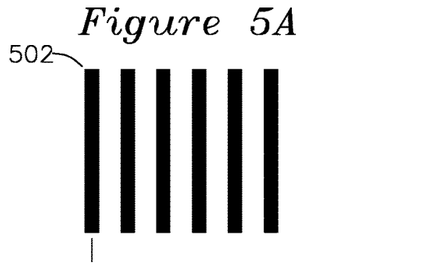
FIG. 5A is an example fiducial mask for focusing the microscope of FIGS. 1 and 4.
Figure 5B:
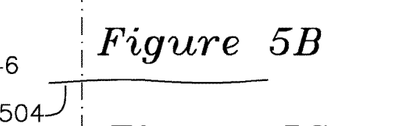
FIGS. 5B, 5C, 5D, 5E are intensity profiles as measured at a detector for objective separation distances from a flow cell.
Figure 5C:
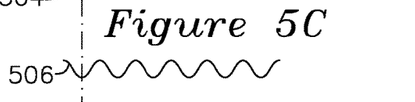
Figure 5D:
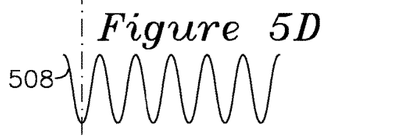
Figure 5E:
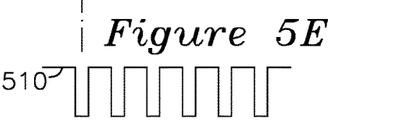

In another example of the invention, an automated focus operation is performed by a mechanical system which adjusts the separation distance L3 144 until a minimal fiducial pattern width and maximum amplitude difference is achieved. FIG. 5A shows an example fiducial focal mask pattern, and FIGS. 5B, 5C, and 5D show the detector response as the distance L3 is varied. An out of focus detector response (along a single line of the 2D detector) is shown as the plot of FIG. 5B. As the distance L3 is varied closer to focus, the fiducial detector response along this single line of the detector has the spatial detector response shown in FIGS. 5C and 5D, with fiducial detector response plot 5E corresponding to optimum focus. As the distance L3 is further increased beyond which the focus of FIG. 5E, the fiducial detector response progresses in sequence to plots 5D, 5C, and 5B.

Figure 6:
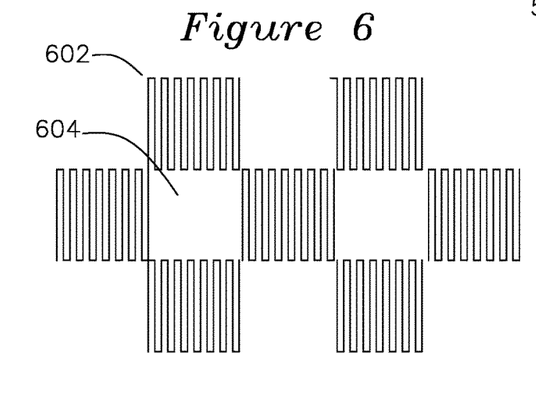
FIG. 6 is a checkerboard fiducial pattern.

One difficulty of an automated focus algorithm is that it may attempt to auto-focus on the fiducial pattern of FIG. 5A with the fiducial detector producing the output of plot 5B for a large fraction of the focal range, which is indeterminate for direction of flow cell movement for optical focus. An alternative fiducial pattern is shown in FIG. 6 as an alternating checkerboard pattern comprising fine structures and coarse structures, thereby providing a coarse focus on the structures 602 and intervening gaps 604, after which the focus algorithm may operate on the fiducial lines of 602 as was described for FIG. 5.

The detector 102 may be a semiconductor or solid state detector array, or alternatively an eyepiece for direct observation. In one example of the invention, the detector 102 is a 2D array of photosensor cells with sufficient density of photosensor cells to form a sharp image of a focused fiducial pattern. In a related example of the invention, the density of photosensor cells is at least 4 resolution linewidths of the linewidth of a fiducial pattern focused onto the detector. In another related example of the invention, the photosensor cell density is such that at least four photosensors are covered by a fiducial pattern when the microscope is focused.

The beam splitter 102 may be a dichroic coating or partially reflective surface on an optically transmissive non-dispersive substrate such as glass. In one example of the invention, the reflective coating may be on the order of 5% reflective and 95% transmissive, and the optical intensity of source 146 is selected to form a reflected image at surface 116 with at least 6 db signal to noise ratio (SNR).

Figure 7:
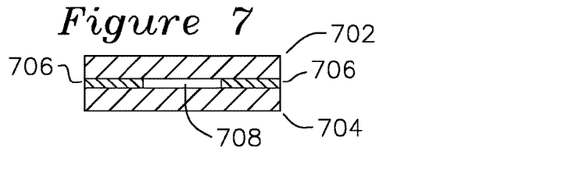
FIG. 7 is an example flow cell construction.

The fluidic chamber 122 is preferably a material with a different index of refraction from the index of refraction of the fluid being conveyed in channel 120, and sufficiently different to form an optically reflective interface sufficient to form an image at the detector. FIG. 7 shows an example flow channel 708 formed by a void in adhesive 706 which separates upper and lower glass plates 702 and 704. In this example, for focusing the system using the fiducial optical path, the reflectance of the air(n1=1.0)/glass(n2=1.5) interface using Fresnel's equations is $$R = \left| \frac{1-1.5}{1+1.5} \right|^2 = 0.04$$

and accordingly T=0.96 of the optical energy continues to the fluidic channel glass/water interface where $$R = \left| \frac{1.5-1.33}{1.5+1.33} \right|^2 = 0.36\%$$

of the remaining optical energy is reflected, of which 96% of that energy is returned through the glass/air interface to the optical path as usable detector optical energy. With respect to the optical energy available to the detector, for a given illumination I entering the flow channel, 0.04I is reflected at the first air/glass interface, and 0.96*0.0036*0.96I=0.0033I is reflected at the upper surface of the flow channel and returned to the detector. In summary, to the detector, the reflection from the air/glass interface forming an artifact is ~10× stronger than the desired flow channel inner surface reflection. These are examples of construction for understanding the invention and are not intended to limit the invention to the examples provided.

Figure 8A:
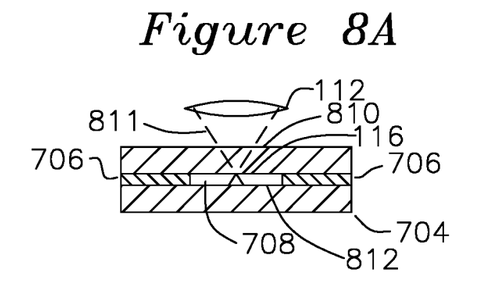
FIG. 8A shows a detail view of a flow channel with a plurality of partially reflective interfaces.
Figure 8B:
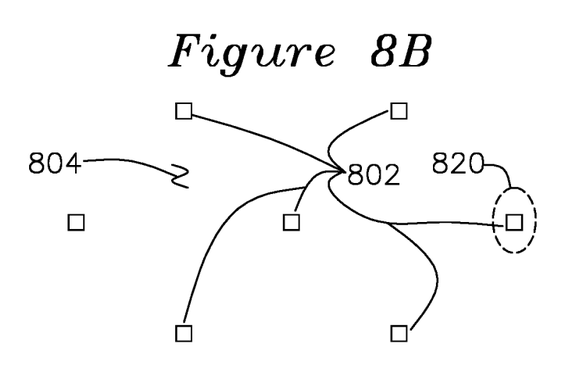
FIG. 8B shows an example checkerboard fiducial pattern.
Figure 8C:
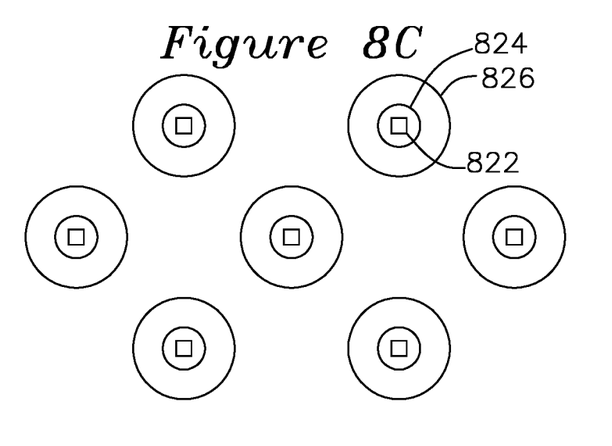
FIG. 8C shows an example detector image of the fiducial pattern of FIG. 8B.
Figure 8D:
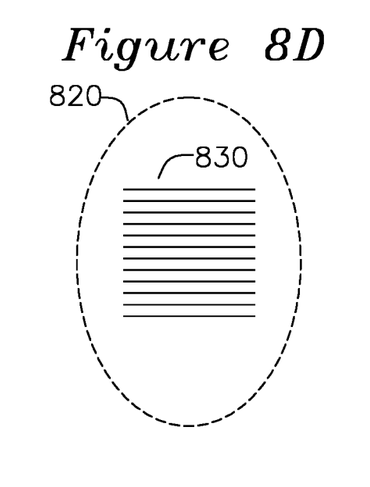
FIG. 8D shows a detail view of a fiducial of FIG. 8B.

A disadvantage of the checkerboard pattern of FIG. 6 is that that where multiple reflective interfaces are present, blurring of the fiducial pattern 602 may occur from the out-of-focus images from the other reflective interfaces above and below the desired reflective interface of the fluid channel which superimpose onto the desired fiducial image from the desired reflective interface. In particular, with respect to FIG. 8A, the previously computed result shows ~10× more optical energy returned to the detector from air/glass interface 810 than from the glass/water reflection at interface 116 of FIG. 8A. To address this, FIG. 8B shows another example of an alternating checkboard pattern which reduces the influence of multiple reflective layers of the flow cell, such as upper reflective surface 810 which is a strong reflector in the present example, its reflection competing with the desired inner upper reflective interface 116 which is the focusing objective, and lower reflective interface 812 of flow channel 708 with spacer 706 as previously described. Objective lens 112 may focus the fiducial image onto a desired reflective interface 116, however upper reflective surface 810 and lower reflective interface 812 also contribute reflective optical energy which is superimposed onto the desired reflective interface 116 response. The alternating checkerboard pattern of FIG. 8B comprises the fiducial patterns 802 arranged such as at regular intervals within large open regions 804. FIG. 8D shows FIG. 8B with detail view 820 of each fiducial, which may be any pattern as previously described, and shown as horizontal lines 830 in FIG. 8D. FIG. 8C shows the resultant image at the detector. The advantage of using the sparsely arranged fiducial pattern becomes clear when viewing the resultant detector image of FIG. 8C, where a focused image has the pattern 822 representing the focused pattern 830, but also includes a weak (comparatively dim compared to pattern 822) circle of confusion artifact 824 from the defocused fiducial reflecting from lower surface 812, as well as a very strong circle of confusion artifact 826 reflecting from top surface 810, which is returning ~10× more optical energy than the desired fiducial image 802 as previously computed. When the microscope is focused on the reflective surface 116, for a point source (very small fiducial extent 802 compared to reflective surface separation distances), the approximate diameter of each artifact 824 and 826 may be determined by ray tracing geometry from lens 112 of FIG. 8A, such that the upper reflective surface artifact 826 may be approximated by the intersection of rays 811 with the upper surface 810, and lower reflective surface artifact 824 may be approximated by the intersection of rays 811 with the lower surface 812, each respectively forming a circle of confusion artifact and the detector, in the approximation where the fiducial extent 802 is negligible dimension compared to the separation distance from reflective surfaces 116 to 812 or from reflective surfaces 116 to 810. The resulting circles of confusion 824 and 826 will change diameter in opposite direction while the focal point is changed between surfaces 810 and 812, and the dimensions of each circle of confusion will indicate the separation distance to a desired reflective interface such as 116 and may be used for initial focusing. The desired reflective interface 116 may therefore be determined from the diameter of the circle of confusion artifacts 824 and 826 in combination with the reflective surface spacings of the flow cell, and thereafter the focus algorithm can change to one of finely adjusted using the pattern of the fiducial itself, such as 830, as was previously described for FIGS. 5A to 5E. To minimize the influence of comparatively strong artifacts 826 on comparatively weak fiducial image 802, it may be desirable to arrange the spacing between fiducial patterns 802 of FIG. 8B to ensure that the circle of confusion artifact 826 does not enter into an adjacent fiducial pattern for reasonable fluidic channel/objective separation distances. It may also be desirable to arrange the separation distances between 801/116 and 116/812 forming the plurality of reflective interfaces to minimize the influence of the circle of confusion artifacts 824 and 826 on the desired fiducial image 822.

In the present application, references to within an order of magnitude of a nominal value include the range of ⅒th of the nominal value to 10 times the nominal value, such as about 10%, 20%, 30%, 40%, 50%, 60%, 70%, 80%, 90%, 110%, 120%, 150%, 200%, 300%, 400%, 500%, 600%, 700%, 800% or 900%. A reference to an approximate value (and where "~" is used to indicate an approximate value) is understood to be within the range of ½ of the nominal value to 2× the nominal value, such as about 60%, 70%, 80%, 90%, 110%, 120%, 130%, 140%, 150%, 160%, 170%, 180% or 190%. Although it is preferred that the axis of fiducial lens 108 be approximately perpendicular to the axis of objective lens 112, any arbitrary angle of the beam splitter 106 may be selected which provides illumination of the fiducial image onto surface 116, such as about 20°, 30°, 40°, 45°, 50°, 60°, 70°, 80°, 90°, 100°, 110°, 120°, 130°, 135°, 140°, 150° or 160°. The substantially planar region of the flow channel is understood to be sufficiently planar to provide a region of focus, such that the variation in diameter in the circle of confusion from one region to another varies by less than a factor of 10. Alternatively, the microscope may operate correctly where the substantially planar region of the flow channel is tilted from the optical axis, or non-planar, but with a restricted region of focus, which will only limit the extent of focused fiducial image and extent of focused fluorescent label detector image. In this example of a tilted or non-planar region, substantially planar is understood to only refer to the region of the image which is focused or can be focused.

The present examples are provided for illustrative purposes only, and are not intended to limit the invention to only the embodiments shown.

We claim:

1. A microscope comprising:
    a fiducial image mask capable of being illuminated on one surface and positioned a focal length from a fiducial lens;
    an objective lens positioned on an axis common to a detector lens;
    a beam splitter positioned between the objective lens and detector lens, the beam splitter capable of receiving optical energy from the fiducial lens and directing the optical energy to the objective lens;
    a detector positioned a focal length from the detector lens and capable of receiving optical energy reflected from a plurality of partially reflective surfaces the reflected optical energy directed through the objective lens, beam splitter, and detector lens; and
    where at least one of the plurality of partially reflective surfaces has an index of refraction which is at least 1% greater or smaller than a different partially reflective surface.

2. The microscope of claim 1 where the fiducial image mask comprises an array of lines or circles.

3. The microscope of claim 2 where the array of lines forms an alternating checkerboard pattern.

4. The microscope of claim 1 where the plurality of partially reflective surfaces comprise a fluidic channel having at least one planar region.

5. The microscope of claim 1 where at least one of the plurality of partially reflective surfaces has an index of refraction which is at least 5% greater or smaller than a different partially reflective surface.

6. The microscope of claim 1 where at least one partially reflective surface is formed by a fluidic channel having a substantially planar inner surface.

7. The microscope of claim 1 where the detector is a 2D array of photodetector cells operative to form 2D images of reflected fiducial optical energy and also 2D images of direct fluorescent label energy from at least one of the plurality of partially reflective surfaces.

8. The microscope of claim 1 where the beam splitter is positioned at approximately a 45 degree angle with respect to an axis of the objective lens and detector lens.

9. A microscope comprising:
    a flow channel having a substantially planar inner surface region, the flow channel operative to carry a fluid;
    a fiducial image mask producing a collimated beam and coupled to a beamsplitter directing the collimated beam to an objective lens and onto the substantially planar region of the flow channel located an adjustable distance from the objective lens;
    a detector lens on a common optical axis with the objective lens and receiving reflected optical energy from the substantially planar region, the reflected optical energy passing through the beam splitter, and thereafter to a detector lens and a fiducial detector positioned a detector lens focal length from the detector lens;
    an optical source for exciting fluorescent labels in the flow channel;
    one or more fluorescent label optical paths coupled to fluorescent label optical energy in the common optical axis, each fluorescent label optical path directing a particular range of wavelengths to an associated fluorescent label detector;
    the adjustable distance from the objective lens to the substantially planar region operative to provide a focused image of the fiducial pattern onto the fiducial detector;
    the one or more detectors of each fluorescent label optical path operative to provide a focused image of fluorescent labels attached to the surface of the flow channel when the optical source is enabled.

10. The microscope of claim 9 where the fiducial detector controls the adjustable distance to form a focused image at the fiducial detector.

11. The microscope of claim 9 where the substantially planar region of the flow channel is an upper surface of the flow channel.

12. The microscope of claim 9 where each fluorescent label path comprises a dichroic reflector, a detector lens and a detector.

13. The microscope of claim 9 where each fluorescent label optical path is operative to independently indicate a fluorescent label associated with at least one of: adenine (A), cytosine (C), guanine (G), thymine (T), and uracil (U).

14. The microscope of claim 9 where the fluidic path has a change in index of refraction of at least 10% in a region perpendicular to the substantially planar region.

15. The microscope of claim 9 where the fiducial image mask comprises an array of lines or circles.

16. The microscope of claim 9 where the fluidic channel is bounded by a glass surface on at least one side.

17. A method for imaging fluorescent labels in a fluidic channel having a reflective interface adjacent to the flow channel, the method operative in a microscope having an objective lens an adjustable distance from the reflective interface, a fiducial pattern generator coupling a collimated fiducial pattern through the objective lens and onto the reflective interface, a detector lens and fiducial detector receiving optical energy reflected from the reflective interface and forming an image at the fiducial detector, and one or more fluorescent label optical paths receiving optical energy from fluorescent labels at the reflective interface, the process comprising:

activating the fiducial pattern generator;

adjusting the distance from an objective lens to the reflective interface until a focused image is present at the fiducial detector;

applying a fluorescent label optical source to cause the fluorescent labels to fluoresce;

forming a focused image of fluorescent labels at each fluorescent label detector of a respective fluorescent label optical path.

18. The method of claim 17 where the fiducial pattern generator is not enabled when the fluorescent label optical source is enabled.

19. The method of claim 17 where the flow channel has an upper surface and the reflective interface is adjacent to an upper surface of the flow channel.

20. The method of claim 17 where each fluorescent label optical path is operative to independently indicate a fluorescent label associated with at least one of adenine (A), cytosine (C), guanine (G), thymine (T), and uracil (U).

21. The method of claim 17 where each fluorescent label optical path comprises a dichroic reflector operative to reflect a particular range of wavelengths and pass other wavelengths, each dichroic reflector directing a particular range of wavelengths to a respective detector lens and a respective fluorescent label detector.

22. The method of claim 17 where adjusting the distance from the objective lens to the reflective interface step is performed with an alternating checkerboard fiducial pattern, the alternating checkerboard formed using a series of fine lines and large gaps, the fiducial detector causing the distance from the objective lens to the reflective interface to be varied until the fiducial detector senses a focused image based on resolving an alternating checkerboard pattern, the fiducial detector causing the distance from the objective lens to the reflective interface to be varied in the same direction until individual lines of the checkerboard are focused.

23. The method of claim 22 where the fiducial detector uses change in a width of fiducial features and the change in a peak to peak amplitude to determine whether to increase or decrease the distance from objective to the reflective interface.

* * * * *